United States Patent
Harris

(10) Patent No.: US 10,209,602 B2
(45) Date of Patent: Feb. 19, 2019

(54) STRETCHABLE ELECTRO-OPTIC DISPLAYS

(71) Applicant: E Ink Corporation, Billerica, MA (US)

(72) Inventor: George G. Harris, Woburn, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/499,941

(22) Filed: Apr. 28, 2017

(65) Prior Publication Data

US 2017/0343879 A1    Nov. 30, 2017

Related U.S. Application Data

(60) Provisional application No. 62/343,775, filed on May 31, 2016.

(51) Int. Cl.

| | |
|---|---|
| *G02B 26/00* | (2006.01) |
| *G02F 1/167* | (2006.01) |
| *B32B 27/36* | (2006.01) |
| *B32B 37/18* | (2006.01) |
| *B32B 38/00* | (2006.01) |
| *G02F 1/1333* | (2006.01) |
| *B32B 38/06* | (2006.01) |

(52) U.S. Cl.
CPC .............. *G02F 1/167* (2013.01); *B32B 27/36* (2013.01); *B32B 37/182* (2013.01); *B32B 38/0008* (2013.01); *B32B 38/06* (2013.01); *G02F 1/133305* (2013.01); *B32B 2307/546* (2013.01); *B32B 2310/0843* (2013.01); *B32B 2457/20* (2013.01); *G02F 2001/1676* (2013.01)

(58) Field of Classification Search
CPC ............. G02F 1/167; G02F 2001/1676; G02F 2001/1678; G09G 3/344; G09G 3/3446; G03G 17/04

USPC .............. 359/296; 345/107; 430/32; 204/600
See application file for complete search history.

(56) References Cited

U.S. PATENT DOCUMENTS

| | | | |
|---|---|---|---|
| 4,418,346 A | | 11/1983 | Batchelder |
| 5,872,552 A | | 2/1999 | Gordon, II |
| 6,130,774 A | | 10/2000 | Albert |
| (Continued) | | | |

FOREIGN PATENT DOCUMENTS

| | | |
|---|---|---|
| JP | 2016048304 A | 4/2016 |
| WO | 2016053902 A1 | 4/2016 |

OTHER PUBLICATIONS

Ahn, Bok Y. et al.; "Omnidirectional Printing of Flexible, Stretchable, and Spanning Silver Microelectrodes"; Science, vol. 323, Issue 5921, pp. 1590-1592; Mar. 20, 2009. Mar. 20, 2009.

(Continued)

*Primary Examiner* — William Choi
(74) *Attorney, Agent, or Firm* — Antranig Baronian

(57) ABSTRACT

A stretchable electro-optic display includes a layer of conductive material and an electrophoretic medium laminated to the layer of conductive material. The layer of conductive material also includes a plurality of nodes and a stretchable interconnect connecting first and second nodes of the plurality of nodes. A method of manufacturing a stretchable electro-optic display is also provided that includes patterning a layer of conductive material to define a plurality of nodes and a stretchable interconnect connecting first and second nodes of the plurality of nodes and laminating a layer of an electrophoretic medium to the layer of conductive material.

15 Claims, 7 Drawing Sheets

(56) References Cited

U.S. PATENT DOCUMENTS

| | | |
|---|---|---|
| 6,144,361 A | 11/2000 | Gordon, II |
| 6,172,798 B1 | 1/2001 | Albert |
| 6,184,856 B1 | 2/2001 | Gordon, II |
| 6,225,971 B1 | 5/2001 | Gordon, II |
| 6,241,921 B1 | 6/2001 | Jacobson |
| 6,271,823 B1 | 8/2001 | Gordon, II et al. |
| 6,672,921 B1 | 1/2004 | Liang |
| 6,788,449 B2 | 9/2004 | Liang |
| 6,825,829 B1 | 11/2004 | Albert |
| 6,866,760 B2 | 3/2005 | Paolini, Jr. |
| 6,922,276 B2 | 7/2005 | Zhang et al. |
| 6,950,220 B2 | 9/2005 | Abramson et al. |
| 6,982,178 B2 | 1/2006 | LeCain et al. |
| 7,002,728 B2 | 2/2006 | Pullen et al. |
| 7,012,600 B2 | 3/2006 | Zehner |
| 7,075,502 B1 | 7/2006 | Drzaic |
| 7,116,318 B2 | 10/2006 | Amundson et al. |
| 7,170,670 B2 | 1/2007 | Webber |
| 7,236,292 B2 | 6/2007 | LeCain |
| 7,312,784 B2 | 12/2007 | Baucom et al. |
| 7,411,719 B2 | 8/2008 | Paolini, Jr. et al. |
| 7,420,549 B2 | 9/2008 | Jacobson |
| 7,443,571 B2 | 10/2008 | LeCain et al. |
| 7,453,445 B2 | 11/2008 | Amundson |
| 7,513,813 B2 | 4/2009 | Paolini, Jr. et al. |
| 7,535,624 B2 | 5/2009 | Amundson et al. |
| 7,561,324 B2 | 7/2009 | Duthaler et al. |
| 7,636,191 B2 | 12/2009 | Duthaler |
| 7,649,666 B2 | 1/2010 | Isobe et al. |
| 7,649,674 B2 | 1/2010 | Danner |
| 7,679,814 B2 | 3/2010 | Paolini, Jr. et al. |
| 7,728,811 B2 | 6/2010 | Albert et al. |
| 7,729,039 B2 | 6/2010 | LeCain et al. |
| 7,791,782 B2 | 9/2010 | Paolini, Jr. |
| 7,826,129 B2 | 11/2010 | Wu |
| 7,839,564 B2 | 11/2010 | Whitesides et al. |
| 7,843,621 B2 | 11/2010 | Danner et al. |
| 7,843,624 B2 | 11/2010 | Danner |
| 8,009,348 B2 | 8/2011 | Zehner et al. |
| 8,034,209 B2 | 10/2011 | Danner |
| 8,068,272 B2 | 11/2011 | LeCain et al. |
| 8,077,381 B2 | 12/2011 | LeCain et al. |
| 8,177,942 B2 | 5/2012 | Paolini, Jr. |
| 8,217,381 B2 | 7/2012 | Rogers et al. |
| 8,319,759 B2 | 11/2012 | Jacobson |
| 8,390,301 B2 | 3/2013 | Danner |
| 8,482,835 B2 | 7/2013 | LeCain |
| 8,786,929 B2 | 7/2014 | LeCain |
| 8,830,553 B2 | 9/2014 | Patry |
| 8,854,721 B2 | 10/2014 | Danner |
| 8,994,705 B2 | 3/2015 | Jacobson |
| 9,075,280 B2 | 7/2015 | Whitesides |
| 9,238,340 B2 | 1/2016 | Kayal |
| 9,538,666 B2 | 1/2017 | Choi et al. |
| 9,554,475 B2 * | 1/2017 | Daniel ................ H05K 1/0283 |
| 9,554,495 B2 | 1/2017 | Danner |
| 2009/0168067 A1 | 7/2009 | LeCain et al. |
| 2011/0164301 A1 | 7/2011 | Paolini, Jr. |
| 2012/0293858 A1 | 11/2012 | Telfer, Jr. |
| 2014/0340738 A1 | 11/2014 | LeCain et al. |
| 2016/0018716 A1 | 1/2016 | Klein |

OTHER PUBLICATIONS

Korean Intellectual Property Office; PCT/US2017/030008; International Search Report and Written Opinion; dated Aug. 9, 2017.

* cited by examiner

STRETCHABLE ELECTRO-OPTIC DISPLAYS

CROSS REFERENCE TO RELATED APPLICATION

This application claims priority to and the benefit of U.S. Provisional Application 62/343,775 filed on May 31, 2016, the contents of which are incorporated herein in its entirety.

FIELD OF THE INVENTION

The present invention relates to electro-optic displays and related apparatus and methods. More specifically, in one aspect this invention relates to stretchable electro-optic displays.

BACKGROUND OF THE INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,825,829; 6,982,178; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; and 9,075,280; and U.S. Patent Applications Publication Nos. 2009/0109519; 2009/0168067; 2011/0164301; 2014/0027044; 2014/0115884; and 2014/0340738;
(d) Backplanes, adhesive layers and other auxiliary layers and methods used in displays; see for example U.S. Pat. Nos. 7,116,318 and 7,535,624;
(e) Color formation and color adjustment; see for example U.S. Pat. Nos. 7,075,502 and 7,839,564;
(f) Methods for driving displays; see for example U.S. Pat. Nos. 7,012,600 and 7,453,445;
(g) Applications of displays; see for example U.S. Pat. Nos. 7,312,784 and 8,009,348; and
(h) Non-electrophoretic displays, as described in U.S. Pat. Nos. 6,241,921; 6,950,220; 7,420,549 8,319,759; and 8,994,705 and U.S. Patent Application Publication No. 2012/0293858.

All patents and applications cited herein are incorporated by reference in their entireties.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In certain applications, stretchable electro-optic displays may be desired; however, conventional electro-optic displays include one or more layers that may inhibit stretching of the display, even if the display is flexible. For instance, considering an electro-optic display having front and rear electrodes on either side of an electro-optic layer, the front and/or rear electrodes may be formed of a material which is stiff and resistant to stretching, such as indium tin oxide (ITO). Generally, flexible displays have been only capable of bending in single axis curves in the same way a piece of paper can bend because stretching may be limited by the most restrictive layer within the electro-optic display. Thus, there is a need for electro-optic displays that are both flexible and stretchable.

SUMMARY OF THE INVENTION

One aspect of the present invention provides an electro-optic display comprising a layer of conductive material and an electrophoretic medium laminated to the layer of conductive material. The layer of conductive material may further comprise a plurality of nodes and a stretchable interconnect connecting first and second nodes of the plurality of nodes.

In another aspect of the present invention, a method of manufacturing an electro-optic display comprising patterning a layer of conductive material to define a plurality of nodes and a stretchable interconnect connecting first and second nodes of the plurality of nodes and laminating a layer of an electrophoretic medium to the layer of conductive material.

These and other aspects of the present invention will be apparent in view of the following description.

BRIEF DESCRIPTION OF DRAWINGS

Various aspects and embodiments of the application will be described with reference to the following figures. It should be appreciated that the figures are not necessarily drawn to scale. The drawing Figures depict one or more implementations in accord with the present concepts, by way of example only, not by way of limitations. In the figures, like reference numerals refer to the same or similar elements.

DETAILED DESCRIPTION OF THE INVENTION

Figure 1:
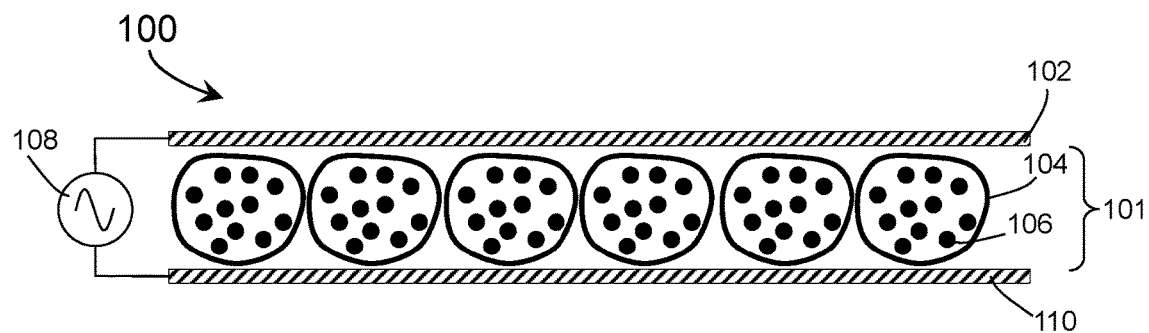
FIG. 1 is a cross-sectional diagram of an example of an electro-optic display.

In the following detailed description, numerous specific details are set forth by way of examples in order to provide a thorough understanding of the relevant teachings. However, it should be apparent to those skilled in the art that the present teachings may be practiced without such details.

Referring generally to the figures, various embodiments of the present invention provide an electro-optic display that includes a layer having a plurality of node regions (also referred to herein simply as "nodes") with a stretchable interconnection between at least two of the nodes. Although the material of the layer may be unstretchable or have limited stretchable properties, the shape of the stretchable interconnections may allow extension of a layer. The stretchable interconnection may be serpentine, winding, zig-zagging, curved, or otherwise shaped such that it may expand and contract when suitably manipulated. In this manner, the distance between nodes connected by the stretchable interconnection may be varied by manipulating (e.g., pulling) the display. When the nodes are pulled apart, the serpentine interconnections will rotate and flex. The flexibility and stretchability of the display may allow the display to conform into a variety of shapes, including shapes having one or more compound curves. In some embodiments, the electro-optic display is an electrophoretic display and the layer having nodes and stretchable interconnections is an electrode of the display.

Various features of the displays may facilitate their use for beneficial purposes, such as in architectural displays and wearable displays. One such feature is the ability of the display to stretch in one or more directions. While flexibility of a display relates to the ability of the display to bend, stretchable characteristics of a display include the ability of the display to elongate and extend to cover more surface area. The display's flexibility combined with its ability to stretch allows the display to bend and/or conform to a three-dimensional shape. A stretchable display may be formed by constructing a display to have portions of the display configured to stretch. Other portions of the display may remain continuous as nodes connected by stretchable interconnections. By extending the interconnections, distances between neighboring nodes may increase, allowing an increase in the area occupied by the display surface. In some embodiments, the stretchable interconnections and the flexibility of the display allow the display to conform to a shape having one or more compound curves. Another feature relates to the ability to design and structure the electro-optic display to include stretchable interconnections in one or more layers of the display. A layer of an electro-optic display may be structured using any suitable technique (e.g., cut with a laser cutter or scissors) to be stretchable. The resolution of the technique may determine the dimensions of the nodes and stretchable interconnections. Another feature relates to the ability to control the electro-optic display by using drive signals to create colors, patterns, or other visual effects.

Aspects of the present application relate to the manner in which the electro-optic display is designed and structured to be stretchable. An electro-optic display may include an electro-optic medium between a front electrode and a rear electrode. In some embodiments, an electro-optic display may have segmented electrodes, and in other embodiments, the electro-optic display may be configured to have active matrix pixels. Applicants have appreciated that properties of materials used in an electro-optic display may limit the ability of the display to stretch, restricting the types of shapes the electro-optic display may form. Accordingly, some aspects of the present application provide one or more layers of an electro-optic display having stretchable interconnect portions, which may improve the ability of the display to stretch and conform to different shapes. In some embodiments, interconnections may be shaped to reduce strain of the material in the display layer as the interconnections elongate into a stretched state. In some embodiments, the width of a stretchable interconnection may have a substantially uniform dimension along the length of the stretchable interconnection. Additionally, the stretchable interconnections may be structured to increase an active area of the display while still providing stretchable capabilities to the display.

The various aspects described above, as well as further aspects, will now be described in detail below. It should be appreciated that these aspects may be used alone, all together, or in any combination of two or more, to the extent that they are not mutually exclusive.

In some embodiments, a stretchable display may be an electrophoretic display. A cross-sectional view of exemplary electrophoretic display architecture is shown in FIG. 1. Display 100 includes an electrophoretic medium layer 101 which may comprise a plurality of capsules 104 having a suspending fluid and electrophoretic particles 106 suspended in the fluid. The electrophoretic medium layer 101 is between electrode 102 and electrode 110. The electrophoretic particles 106 may be electrically charged and responsive to an electric field differential created by electrode 102 and electrode 110. Examples of suitable electrophoretic medium layers are described in U.S. Pat. Nos. 6,982,178 and 7,513,813. In some embodiments, the electrophoretic medium layer may be relatively more stretchable than other layers in the display such as electrode 102 and electrode 110, and a stretchable display may be formed by structuring the other layers to include stretchable interconnections. In this manner, all the layers of the display may allow for stretching.

Reference to the two electrodes may be described based on the viewing surface of the display. For example, electrode 102 may be referred to as a front electrode, and electrode 110 may be referred to as a rear electrode if the surface of display 100 proximate to electrode 102 is the viewing surface. Electrode 102 and/or electrode 110 may be optically transparent. Electrode 102 may be a single common transparent electrode on one side of the electrophoretic medium layer 101, extending the length of the display. Electrode 110 lies on the opposite side of the electrophoretic medium layer 101 from the electrode 102. In some embodiments, the electrode 110 may also be a common electrode like the electrode 102, extending the length of the display 100. Alternatively, the electrode 110 may be pixelated to define pixels of the display.

The display 100 also includes a voltage source 108 coupled to the electrodes 102 and 110 and configured to provide a drive signal to those electrodes. The provided voltage then creates an electric field between the electrodes 102 and 110. Thus, the electric field experienced by the electrophoretic medium layer 101 may be controlled by varying the voltage applied to the electrodes 102 and 110, and in the scenario in which one or both of those electrodes is pixelated varying the voltages applied to the desired pixels may provide control over the pixels of the display. Particles 106 within the electrophoretic medium layer 101 may move within their respective capsules 104 in response to the applied electric field created by the voltage differential between electrodes 102 and 110.

The electrode 102 and/or 110 may be structured to include stretchable interconnections, providing stretchable capabilities to the display 100 even if the material that forms the electrodes is not itself significantly stretchable. For example, the electrode 102 and/or electrode 110 may be formed of indium tin oxide (ITO) which has limited stretching properties, but by constructing electrode 102 and/or 110 to have stretchable interconnections, the stretching properties of electrode 102 and/or 110 may be increased. Additionally, the electrode 102 and/or electrode 110 may be flexible, providing flexibility to the display 100. For example, at suitably thin dimensions, the ITO may be flexible. Thus, in some embodiments, the electrode 102 and/or electrode 110 may be a thin layer of ITO. In such situations, the ITO may be less than, for example, 15 mil, less than 10 mil, or any value within those ranges, or any other value providing desired flexibility in those situations in which a flexible display is desired. The use of ITO as electrode 102 may be beneficial in those situations in which electrode 102 represents a viewing side of the display 100, since an ITO electrode may be transparent. Still, other electrode materials may be used as alternatives.

The electrode 102 and/or electrode 110 may each optionally be formed on a substrate, such as a substrate of polyethylene terephthalate (PET). Such a substrate may be transparent, thus not negatively impacting the display performance of the display 100. As with the electrodes 102 and 110 themselves, any substrates for the electrodes may be formed of a material and structured with stretchable interconnections which provide desired stretching capabilities. Dimensions similar to those listed above for the electrodes 102 and 110 may be used for any substrates to provide desired flexibility of the display. For ease of illustration, the substrates are not illustrated separately in FIG. 1.

While FIG. 1 illustrates a microcapsule type electrophoretic display, various types of displays may be used according to the techniques described in the present application. Generally, electro-optic displays including microcapsule type electrophoretic displays, microcell type electrophoretic displays, and polymer dispersed electrophoretic image displays (PDEPIDs) may utilize aspects of the present application. Moreover, although electrophoretic displays represent a suitable type of display according to aspects of the present application, other types of displays may also utilize one or more aspects of the present application. For example, Gyricon displays, electrochromic displays, and polymer dispersed liquid crystal displays (PDLCD) may also take advantage of aspects of the present application.

The electro-optic displays described herein may have any suitable dimensions, and in some embodiments may be small. For example, the display 100 may be small in at least some embodiments, which may contribute to its flexible nature. For example, each of the electrode 102 and electrode 110 may be between 1 mil (thousandth of an inch) and 10 mil, such as 5 mil each, or between 0.1 mm and 0.5 mm. The electrophoretic medium layer may be between 0.5 mil and 5 mil, such as 1 mil, or between approximately 0.03 mm and 0.06 mm. Thus, in some embodiments, the display 100 may have a total thickness of approximately 10-15 mil, or between approximately 0.2 mm and 0.4 mm. The listed examples of dimensions are non-limiting, as other dimensions may be used.

Figure 2:
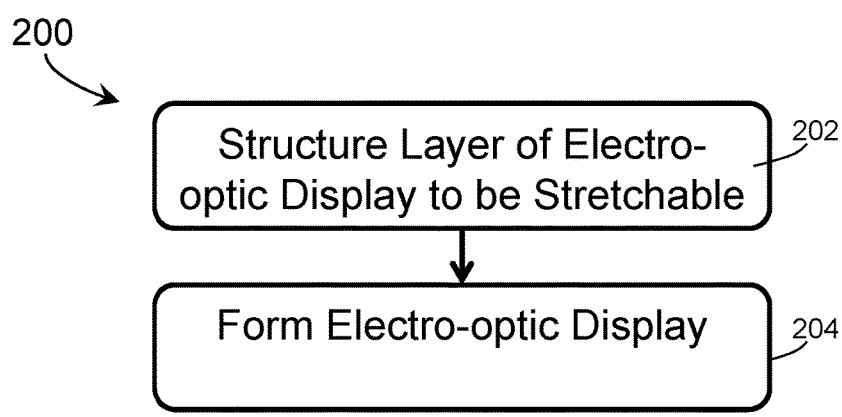
FIG. 2 is a schematic illustrating an exemplary method for forming a display capable of conforming into a shape with compound curves.
Figure 3A:
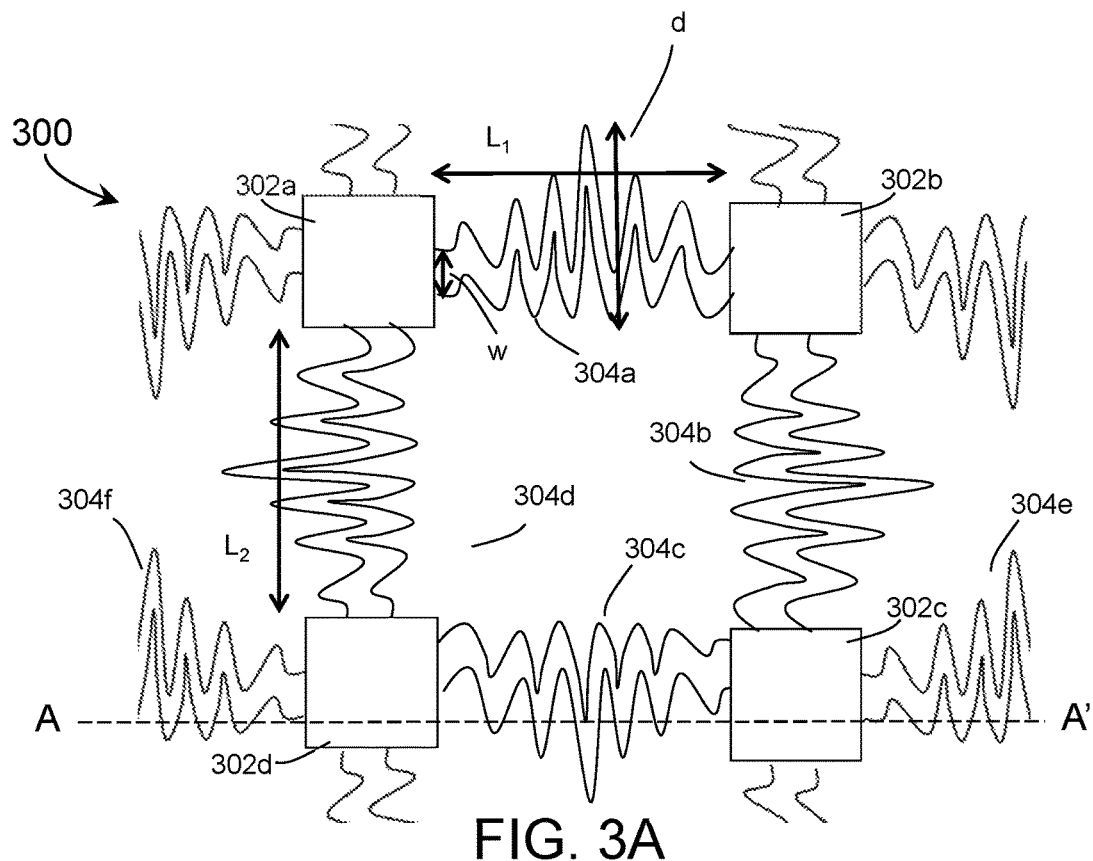
FIG. 3A is a schematic illustrating an exemplary display layer structured to stretch in one or more directions.
Figure 3C:
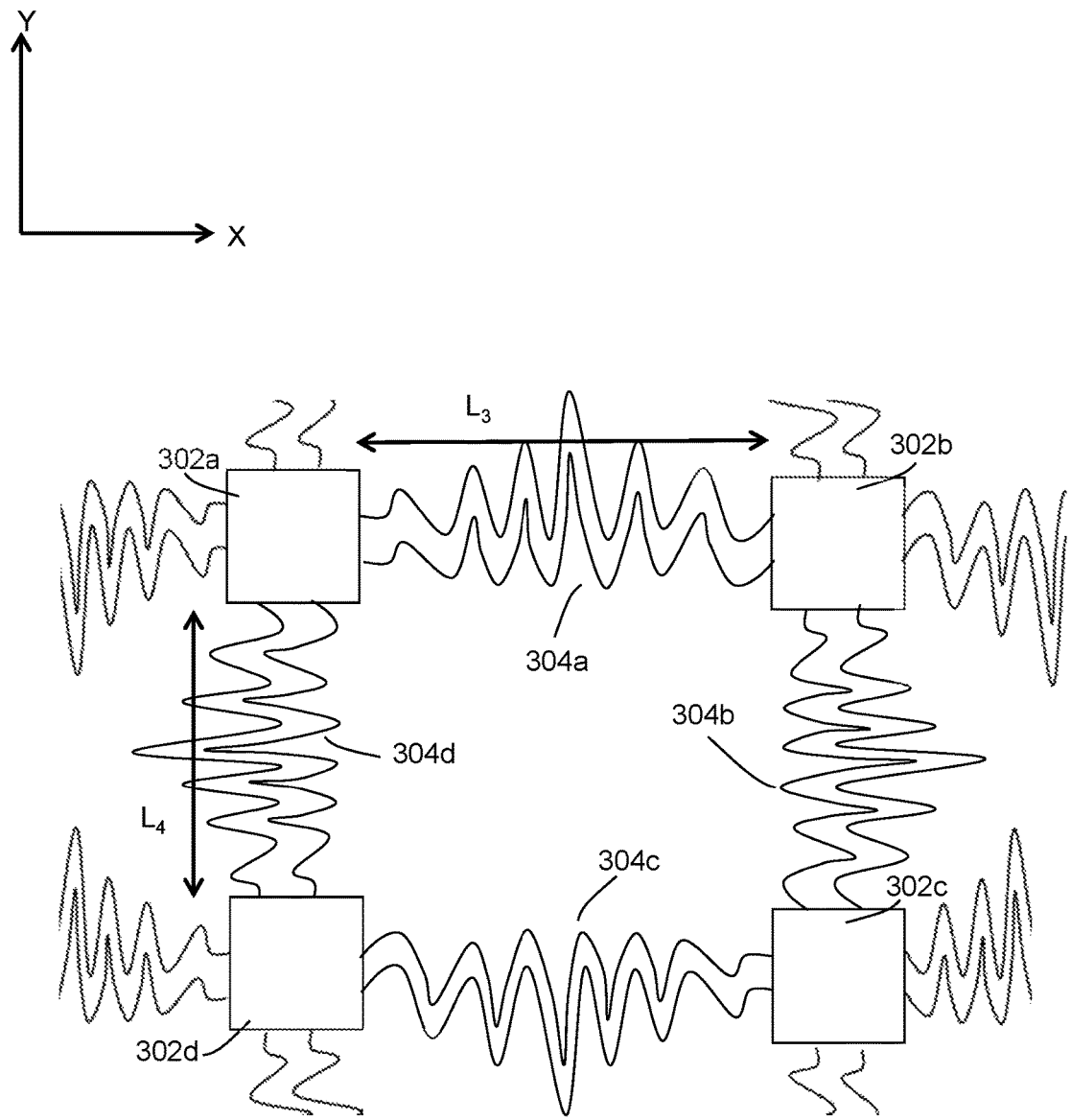
FIG. 3C is a schematic illustrating a stretched state of the display layer shown in FIG. 3A.
Figure 4:
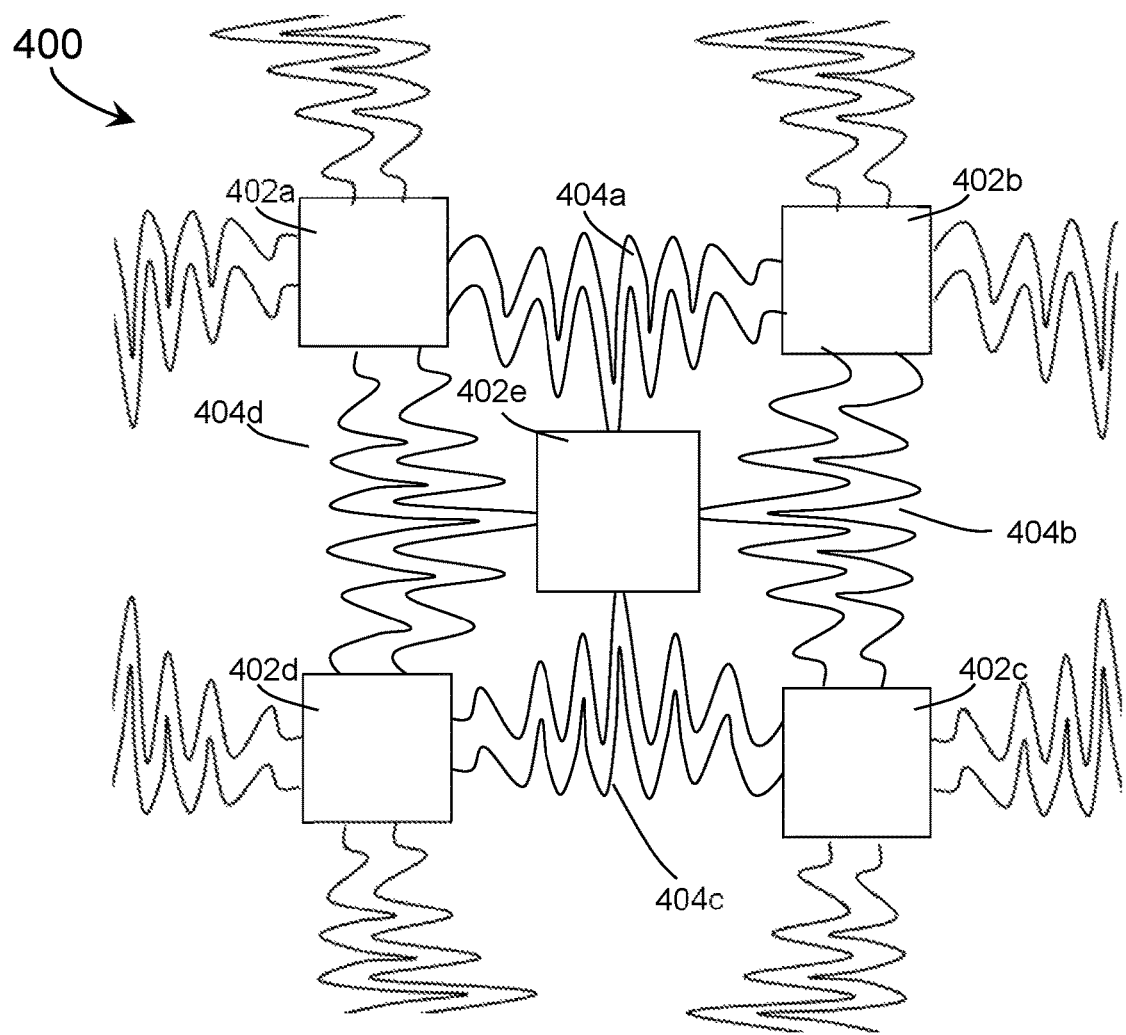
FIG. 4 is a schematic illustrating an exemplary display layer structured to stretch in one or more directions, according to a non-limiting embodiment.

As discussed above, some or all of the layers in an electrophoretic display may be structured to have stretchable interconnections. Since a continuous layer may restrict overall stretching properties of the display, structuring of the layer to have stretchable interconnections may improve the ability of the display to stretch. In some embodiments, the material of which a layer of the display is formed may be relatively unstretchable, but the layer may be structured to have stretchable interconnections, for example by suitable patterning of the layer. A stretchable electrode layer (e.g., an electrode layer formed from ITO and suitably patterned) may be structured to have nodes connected by stretchable interconnections, while other layers of the display, such as the electrophoretic medium layer, are continuous. In some embodiments, an unstretchable substrate material (e.g., PET) may be structured as a display layer to have nodes connected by stretchable interconnections. In some embodiments, all layers in a display may be configured to have nodes connected by stretchable interconnections. Such a display may have openings through all layers of the display, allowing the display to be used for purposes where openings in the display are desired, including wearable display applications in which the display is worn by a person and the openings provide passage of air and moisture, allowing breathability similar to a fabric. In some embodiments, the display may include an elastomer such as an elastomeric film layer. The elastomer may provide mechanical structure to the display and/or protect the structuring of one or more layers having stretchable interconnections. The elastomer may optionally be optically hazy, either by incorporating a scattering filler or a textured surface of the elastomeric layer, to hide the cut lines bounding the interconnections, which may improve readability of the electro-optic display. Aspects of the present application relate to a manner of structuring a display layer to be stretchable and forming a stretchable display of the types described herein. FIG. 2 illustrates exemplary method 200 for forming a stretchable display according to aspects of the present application. Method 200 begins with act 202 of structuring one or more layers of an electro-optic display to have any suitable configuration of nodes and stretchable interconnections, examples of which are illustrated in FIGS. 3A, 3C, and 4, and described in detail below. In some embodiments, the stretchable interconnections are configured to deform when a force is applied to a structured layer and/or a display having a structured layer while the nodes are continuous regions of a structured layer and have a limited ability to deform under force. In some embodiments, the nodes are configured to deform. A node has at least one interconnect; preferably, at least three interconnects. The shape of nodes and location of interconnect(s) may depend on how much and in what direction the display needs to stretch. The nodes provide electrical and mechanical connection between multiple interconnects. Having multiple interconnects on each node provides tolerance against interconnect failures. For example, if an interconnect fails, the nodes on either side of the failed interconnect, having connections to other interconnects, will continue to be driven and supported by the remaining interconnects. Most likely, only the conductor (e.g. ITO) will crack and the supporting material (e.g. PET) will still be connected and the electro-optic layer will still be functional. Because both ends of the interconnect will still be electrically connected to the nodes, which are still electrically connected to the rest of the display, even the cracked interconnect will continue to operate. In other words, there will be no loss of active area.

Any suitable dimensions for the nodes and stretchable interconnections may be used. In some embodiments, an interconnection of a structured layer may be structured to provide uniform deformation as the structured layer is stretched. Both node and interconnection regions may have a similar cross-sectional material composition, and the ability of the interconnections to deform is based primarily on the shape of the interconnections. The layer may be an electrode layer, electrophoretic medium layer, and/or a substrate layer. The layer may initially be formed as a continuous layer, and may be structured to have nodes and stretchable interconnections by removing portions of the layer. Any suitable technique(s) for removing portions of a display layer may be used, such as laser cutting, using scissors, or using other cutting tools. When the layer structured to be stretchable is an electro-optic medium layer, for example having one or more openings or patterns therein, an optional barrier layer or protective sheet, or an edge seal may be applied to the display to keep out moisture and/or prevent leakage of electro-optic materials from the display. Examples of such seals are described in U.S. Pat. No. 7,649,674.

Electro-optic displays may be formed at act 204 by adhering the layers of the display together. An electro-optic display may be fabricated by laminating the two electrodes (front and rear electrodes) with the electro-optic layer in between. For example, the front electrode and electro-optic layer may be affixed to each other, constituting a front plane laminate, and may have a backing lamination adhesive with a release sheet affixed thereto. The release sheet may be removed and the front plane laminate affixed to the rear electrode. In some embodiments, a roll-to-roll process may be used, in which the front electrode and electro-optic layer are rolled onto the rear electrode. Examples of this type of processing are described in U.S. Pat. Nos. 6,982,178 and 7,513,813. These techniques may be used to manufacture displays such as display 100 of FIG. 1. Alternative processes for making the display may be used. Techniques used to construct active matrix pixel displays may be used to form an electro-optic display with a segmented electrode as a rear electrode.

The result of act 204 is a stretchable electro-optic display. As previously described, the stretchable electro-optic display may include one or more layers (e.g., an electrode) which are structured (e.g., patterned) to exhibit the capability to stretch even though formed of material(s) with relatively low inherent stretching capability, and one or more layers (e.g., an electro-optic medium layer) exhibiting a relatively high capability to stretch.

One or more individual layers of a stretchable display may be coupled to drive circuitry. According to aspects of the present application, electrical connection regions on individual displays may be coupled to drive circuitry using any suitable technique such as through soldering, conductive glue, pin connections, and/or other types of electrical connections. Some embodiments may use rivet connections formed by inserting a conductive connector through an opening in the two electrodes and the electro-optic layer of the display. In such embodiments, the connector may be positioned to mechanically and electrically contact one of the two electrodes. In some embodiments, a printed circuit board (PCB) holding drive circuitry for one or more electro-optic displays in a composite display is coupled to an electrode of the one or more displays. Thus, as described previously, control of the individual electro-optic displays of a stretchable display may be provided.

The resulting stretchable display may be conformed into a shape having one or more compound curves. A stretchable interconnection connecting two nodes may stretch from an unstretched or relaxed state to a stretched state as the display conforms to the shape. The dimensions of the stretchable interconnection may determine a degree of stretching for the stretchable interconnection. The material properties of the layer having the stretchable interconnection may also determine the degree of stretching. In some embodiments, the dimensions of the interconnection may be configured to reduce the strain at certain regions of the interconnection as the interconnection elongates into a stretched state. The length of the stretchable interconnection may elongate from the unstretched to the stretched state, increasing the distance between the two nodes. In this manner, regions of the display may stretch from an unstretched state to conform to the shape. The display in the stretched state may cover a larger surface area than the display in the unstretched state. Similarly, a stretched region of a display may contract to a less stretched or relaxed state as the display stretched to conform to a shape returns to an unstretched state. An interconnect is preferably 3 mm wide but may be as small as 1 mm wide or as large as 10 mm wide or even wider depending on the size and application of the stretchable display. The lower range limit on the width is limited by the applied cutting technique. For example, most laser cutting typically has a practical limit of 1 mm feature width. The upper range limit on the width is limited by the curvature of the surface the part will be stretched over. A smaller curvature will require finer nodes and interconnects. The length of the interconnects will determine how much the display can stretch.

It should be appreciated that the order of conforming a display and coupling the display to drive circuitry is not limited to coupling the display prior to conforming the display, and that some embodiments include conforming the display into a shape having one or more compound curves prior to coupling the display to drive circuitry. One or more layers may be structured with any suitable arrangements of nodes and stretchable interconnections to achieve desired stretchable characteristics of the resulting display. FIG. 3A illustrates a layer 300 of an electro-optic display having an exemplary arrangement of nodes 302a-302d and labeled interconnections 304a-304f as well as other unlabeled interconnections. A display having layer 300 may be stretched in one or more directions by extending at least a portion of the stretchable interconnections. Layer 300 may be an electrode layer, such as electrodes 102 and 110, and/or a substrate layer. In some embodiments, a display may include multiple layers having a similar structure of nodes and interconnections such that openings are present in the display.

An active area of a display may be defined by regions of the display where a structured electrode layer has continuous portions of the electrode material. For a display with a structured electrode layer, such as having the arrangement of layer 300, the configuration of the nodes and interconnections of the structured electrode layer may define the active surface area of the display because the continuous portions of the electrode layer drive the electrophoretic medium. Since such an electrode layer is not continuous, portions of the electrode layer where there are either nodes or interconnections may form regions of the display that are active. While openings of the electrode layer, such as regions that lack electrode layer material, create regions of the display that are inactive since no electrode layer is present to drive the electrophoretic material. The electrode layer may be patterned with nodes and interconnections to achieve a suitable active area of the display. In some embodiments, configuration of the nodes and interconnections may provide sufficient display active area such that inactive regions are unnoticeable to a viewer of the display. Preferably, the active area of the display will be at least 85% when unstretched. More preferably, the active area of the display will be at least 95% when unstretched. Most preferably, the display is 100% or almost 100% active. In some applications, the amount of active area is less critical and an active area of approximately 85% or less may be acceptable. The inactive area of a display may include any top plane connections and the width of the cuts between nodes and interconnects. Laser cutting, a preferred method of cutting, may have a cut width of about 0.1 mm, which contributes to the inactive area of the display.

Figure 3B:
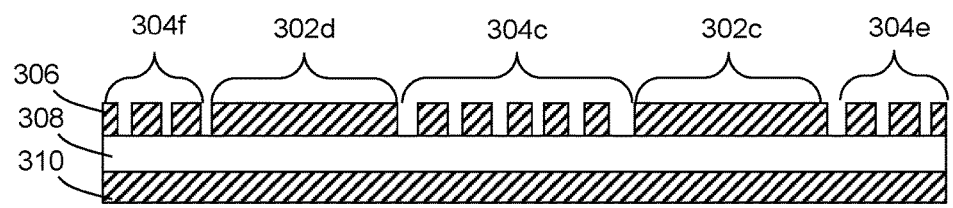
FIG. 3B is a schematic illustrating an exemplary cross-sectional view of a display having the display layer shown in FIG. 3A.

FIG. 3B is a cross-sectional view along line A-A' in FIG. 3 of a display having electrode layer 306 structured as layer 300. Electrode layer 306 has continuous portions of electrode material as nodes 302d and 302c and portions forming stretchable interconnections 304c, 304e and 304f. In this exemplary embodiment, electrode layer 310 is continuous, as shown in FIG. 3B. Electrophoretic medium layer 308 is between electrode layers 306 and 310. Since the display is controlled by applying voltage across the electrophoretic medium layer 308, the active areas of the display shown in FIG. 3B are where there are portions of electrode layer 306. Although FIG. 3B shows one structured electrode layer with nodes and interconnections, other layers in a display may have similar structuring. In some embodiments, both electrodes 306 and 310 may be suitably structured to provide stretching capabilities to a display. Such an implementation may be suitable when materials for both electrode layers have restricted stretching properties. In some embodiments, electrophoretic layer 308 and electrode layers 306 and 310 may be structured with nodes and stretchable interconnections which may be desirable for applications where the display is both capable of stretching and allows moisture and air to pass through, such as in wearable display applications.

The nodes may be patterned within layer 300 to have any suitable placement, spacing, and shape. For simplicity, only four nodes are illustrated in FIG. 3A, but in practice a display layer may have many more (for example, greater than 10 nodes, greater than 100 nodes, greater than 1,000 nodes, between 10 and 500 nodes, or any number or range of numbers within such ranges). The nodes may be uniformly positioned, for example in an array, although other arrangements are possible. In one embodiment, the nodes may be arranged on the backplane of an electric-optic display to provide areas on which delicate active components, such as transistors and storage capacitors, may be located.

In FIG. 3A, nodes 302a-302d are in a square arrangement and are connected by interconnections 304a-304d, however, other arrangements of nodes and interconnections may be suitable depending on the desired properties of the resulting display. Although nodes 302a-302d are shaped into squares, nodes may have any suitable shape and/or dimension. Spacing between two nodes may be configured by the dimensions of an interconnection connecting the two nodes. For example, length, $L_1$, of interconnection 304a defines a distance between nodes 302a and 302b, and length, $L_2$, of interconnection 304d defines a distance between nodes 302a and 302d.

The interconnections may be patterned within layer 300 to have any suitable placement and shape. Although one shape is illustrated in FIG. 3A, an interconnection may be structured to have any suitable shape, such as serpentine, winding, zig-zagging, curved, or otherwise shaped such that the layer having the interconnection may expand and contract when suitably manipulated. The shape and/or dimensions of the nodes and stretchable interconnections may be selected based on the application of the resulting display. The extent to which a stretchable interconnection can extend may depend on a width of the material of the interconnection and a lateral dimension of the shape of the interconnection. As an example, FIG. 3A indicates width, w, and lateral dimension, d, for interconnection 304a. For an interconnection, the width and/or dimension may vary to provide a desired amount of stretching for the interconnection. The lateral distance and width of the serpentine interconnections determine the amount of extension between the nodes that will be possible without damage to the electro-optic display. Generally, the longer the lateral distance, the greater the extension possible because the deformation is spread out over a longer path.

Dimensions and shape of an interconnection may be selected based on the material properties of layer 300 to reduce an amount of strain at points along the interconnection. In some embodiments, uniform deformation over the length of an interconnection may be achieved by varying the width and/or lateral dimension to reduce regions within the interconnection that may restrict elongation of the interconnection. In some embodiments, an electrode layer of a display may be constructed with nodes and interconnections to achieve an amount of active surface area with a degree of stretching for the display. Typically, the stretchable portions of the display may move in more than one axis and may move along multiple planes.

Relative distances between nodes may vary by stretching one or more interconnections. FIG. 3C is a stretched state of layer 300 stretched along the x-direction. Interconnections 304a and 304c are elongated and have a larger length along the x-direction, $L_3$, in the stretched state shown in FIG. 3C in comparison to the less stretched state or relaxed state of layer 300 with length $L_1$ between interconnections 304a and 304c shown in FIG. 3A. By stretching in the x-direction and extending interconnection 304a, the distance between nodes 302a and 302b is greater in the stretched state (FIG. 3C) than in the unstretched state (FIG. 3A). A structured layer may be stretched non-uniformly such that some interconnections are elongated from a relaxed state and some interconnections remain in a relaxed state. In this manner, a stretched state of a layer or a display having a structured layer may include one or more interconnections with no or limited stretching, such as interconnection 304d shown in FIG. 3C. Since there is limited or no stretching along the y-direction in the stretched state depicted in FIG. 3C, interconnection 304d has a length, $L_4$, which is similar to the length when layer 300 is in a relaxed state, $L_2$.

FIG. 4 is another exemplary arrangement of nodes 402a-402e and stretchable interconnections (some labeled as 404a-404d) for layer 400 of a display. As shown in FIG. 4, node 402e is connected to central portions of interconnections 404a-404d. Such an arrangement may increase an amount of material remaining in layer 400 and may be desirable for certain display applications. As an example, an electrode layer configured to have an arrangement of layer 400 may produce a display with a desirable amount of active surface area since the surface area of the electrode layer drives the electrophoretic medium in the display. An active area of a display may be defined by regions of the display where a structured electrode layer has continuous portions of the electrode material.

Figure 5:
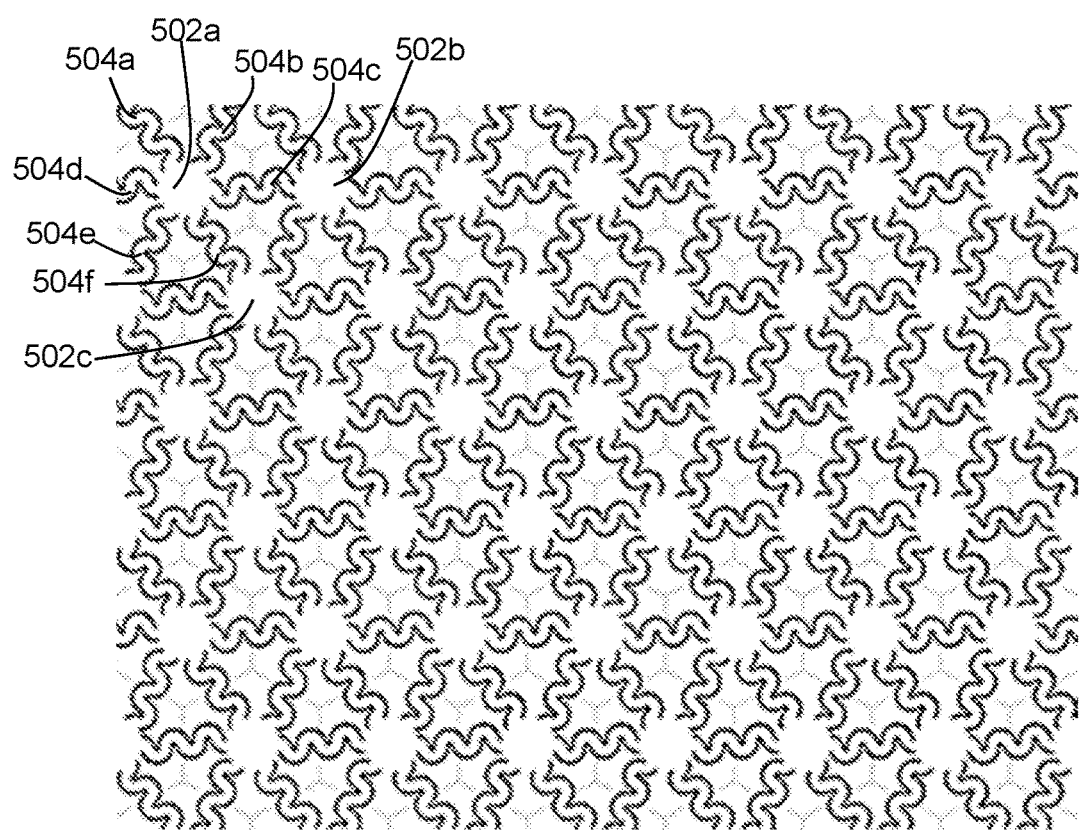
FIG. 5 is a schematic illustrating an exemplary display layer structured to stretch in one or more directions, according to a non-limiting embodiment.

FIG. 5 is an exemplary arrangement of nodes connected to each other by stretchable interconnections to form a layer of a display. As shown, the dark black wavy lines represent cut lines, which form the stretchable interconnections, while the light gray lines simply designate the hexagonal nodes. As shown in FIG. 5, nodes are arranged within a pattern of hexagonal-shaped regions where stretchable interconnections connect neighboring nodes. Node 502a is connected to stretchable interconnections 504a-504f, which are arranged radially around node 502a. Stretchable interconnections 504c and 504f connected to node 502a are also connected to nodes that neighbor node 502a. For example, stretchable interconnection 504c is connected to both node 502a and 502b, and stretchable interconnection 504f is connected to both node 502a and node 502c. In this manner, an active area of a display may be defined by the nodes and stretchable interconnections that connect the nodes.

Figure 6A:
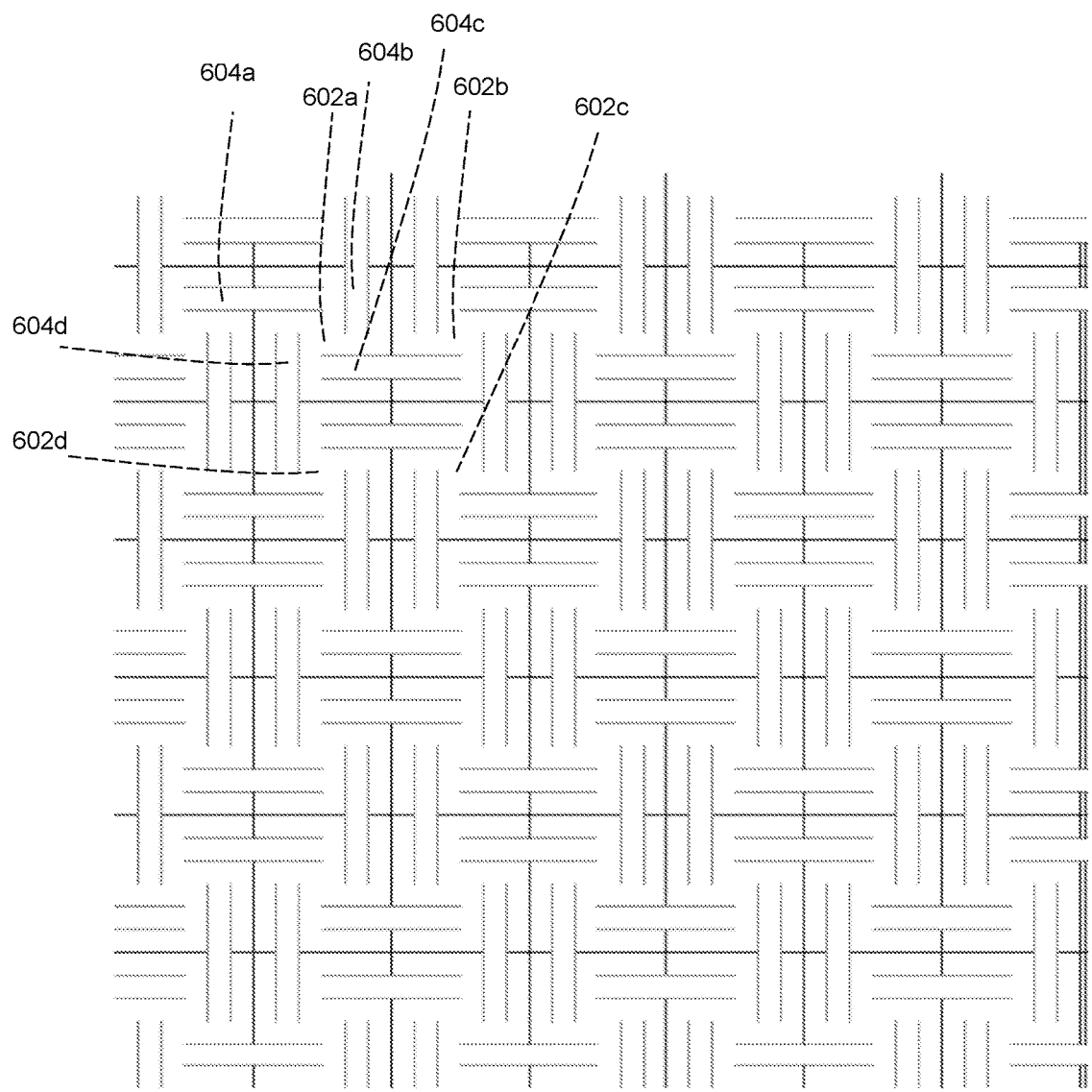
FIG. 6A is a schematic illustrating an exemplary display layer structured to stretch in one or more directions, according to a non-limiting embodiment.

FIG. 6A. is an exemplary arrangement of interconnections connecting to deformable nodes. As shown, the dark black lines represent cut lines and define the nodes (square shaped) 602a, 602b, 602c and 602d; the light gray lines represent cut lines as well and define the interconnections 604a, 604b, 604c and 604d of node 602a connecting to the neighboring nodes.

Figure 6B:
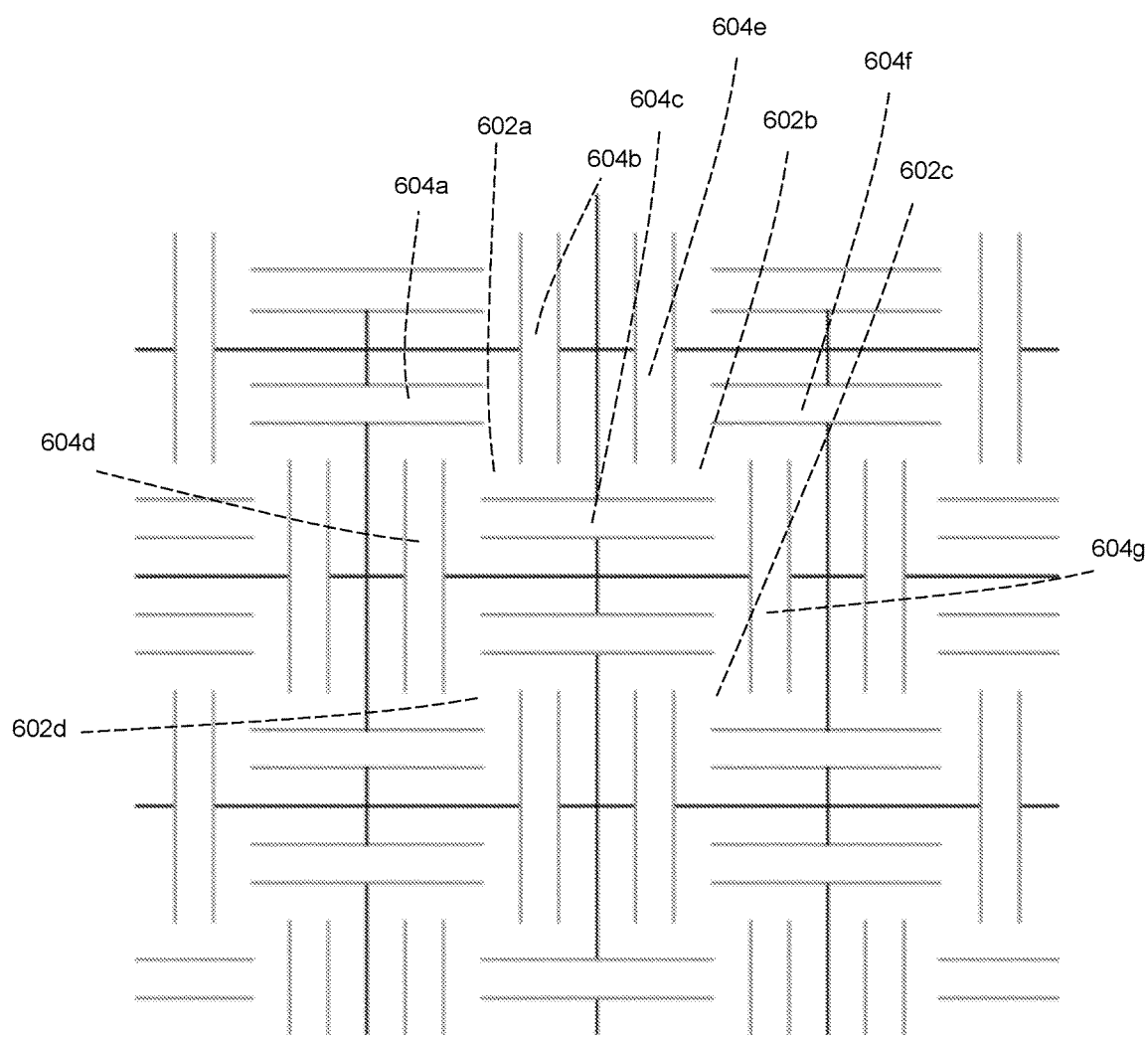
FIG. 6B is a magnified version of the schematic of FIG. 6A.

FIG. 6B is a magnified version of FIG. 6A. Nodes 602a, 602b, 602c and 602d are neighboring nodes and have four interconnections each. Some of the interconnections are labeled 604a-604g. When the display is stretched, the interconnects (i.e., 604a-604g) remain fairly straight and the nodes 602a-602d distort to stretch the display, primarily along the Z-axis. Although the cut lines forming the interconnections 604a-604g are illustrated as uniform parallel lines, the spacing between the cut lines and the relative length of the cut lines may be varied depending on the desired stretchability and/or flexibility of the final display. For examples, the light gray cut lines closer in proximity to the dark black cut lines may be spaced closer together than the light gray cut lines that are relatively farther from the dark black cut lines. This would provide more active area in the central region of the nodes than the periphery of the nodes.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

I claim:

1. An electro-optic display comprising:
    a layer of conductive material comprising a plurality of cuts, the cuts forming a boundary of a plurality of nodes and a stretchable interconnect, the stretchable interconnect connecting first and second nodes of the plurality of nodes; and
an electrophoretic medium laminated to the layer of conductive material.

2. The electro-optic display of claim 1, wherein the electro-optic display is configured to stretch between a first stretched state in which the stretchable interconnect is stretched and a second unstretched state in which the stretchable interconnect is not stretched, and wherein at least one of a length or width of the electro-optic display is greater during the first stretched state than the second unstretched state.

3. The electro-optic display of claim 2, wherein a distance between the first node and the second node is larger when the electro-optic display is in the first state than in the second state.

4. The electro-optic display of claim 1, wherein the stretchable interconnect has a sinusoidal shape.

5. The electro-optic display of claim 1, wherein the electro-optic display is configured to conform into a shape having at least one compound curve when the stretchable interconnect is in a stretched state.

6. The electro-optic display of claim 1, wherein the stretchable interconnect has a lateral dimension and a width, and a degree of stretching the interconnect region is dependent on the lateral dimension and the width.

7. The electro-optic display of claim 1, further comprising an elastomeric film adhered to a surface of the display and configured to provide mechanical support to the electro-optic display.

8. A method of manufacturing an electro-optic display, comprising:
    cutting a layer of conductive material to define a plurality of nodes and a stretchable interconnect connecting first and second nodes of the plurality of nodes; and
    laminating a layer of an electrophoretic medium to the layer of conductive material.

9. The method of claim 8, wherein cutting the layer of conductive material to define a plurality of nodes and a stretchable interconnect comprises forming at least two square-shaped nodes.

10. The method of claim 8, wherein cutting the layer of conductive material to define a plurality of nodes and a stretchable interconnect comprises forming at least two hexagonal nodes.

11. The method of claim 8, wherein cutting the layer of conductive material to define a plurality of nodes and a stretchable interconnect comprises forming a serpentine interconnect having a first end coupled to the first node and a second end coupled to the second node.

12. The method of claim 11, wherein forming the serpentine interconnect further comprises forming the serpentine interconnect such that the serpentine interconnect couples to a third node of the plurality of nodes at a point along the serpentine interconnect between the first end and the second end.

13. The method of claim 8, wherein cutting the layer of conductive material comprises cutting the front electrode with a laser.

14. The method of claim 8, wherein cutting the layer of conductive material is performed prior to the laminating step.

15. The method of claim 8, wherein cutting the layer of conductive material is performed subsequent to the laminating step.

* * * * *